(12) United States Patent
Weiss et al.

(10) Patent No.: US 8,996,407 B2
(45) Date of Patent: Mar. 31, 2015

(54) METHOD AND APPARATUS FOR PERFORMING A FINANCIAL TRANSACTION

(75) Inventors: Benjamin R. Weiss, Portola Valley, CA (US); Jim Del Favero, Redwood City, CA (US); David A. Wolbert, Redondo Beach, CA (US)

(73) Assignee: Intuit Inc., Mountain View, CA (US)

( * ) Notice: Subject to any disclaimer, the term of this patent is extended or adjusted under 35 U.S.C. 154(b) by 1399 days.

(21) Appl. No.: 11/796,578

(22) Filed: Apr. 27, 2007

(65) Prior Publication Data
US 2008/0270277 A1  Oct. 30, 2008

(51) Int. Cl.
*G06Q 30/00* (2012.01)
*G06Q 40/00* (2012.01)
*G06Q 20/10* (2012.01)
*G06Q 20/02* (2012.01)
*G06Q 40/02* (2012.01)

(52) U.S. Cl.
CPC ............. *G06Q 20/10* (2013.01); *G06Q 20/02* (2013.01); *G06Q 40/02* (2013.01); *G06Q 40/00* (2013.01)
USPC ........................................ 705/14.73; 705/39

(58) Field of Classification Search
CPC .............................. G06Q 30/02; G06Q 20/10
USPC ......... 705/1–20, 35, 65, 14.71, 39, 26, 14.73; 707/1–10
See application file for complete search history.

(56) References Cited

U.S. PATENT DOCUMENTS

| | | | | |
|---|---|---|---|---|
| 2002/0062249 A1* | 5/2002 | Iannacci | .......................... | 705/14 |
| 2004/0083183 A1* | 4/2004 | Hardesty et al. | ................. | 705/65 |
| 2005/0234778 A1* | 10/2005 | Sperduti et al. | ................. | 705/22 |

* cited by examiner

*Primary Examiner* — Sun Li
(74) *Attorney, Agent, or Firm* — Park, Vaughan, Fleming & Dowler LLP

(57) ABSTRACT

A system that performs a financial transaction on behalf of a user is presented. During operation, the system receives parameters for the financial transaction. Next, the system analyzes the parameters to determine financial benefits of using one or more subsets of financial sources from a set of financial sources associated with the user to fulfill the financial transaction. The system then selects a subset of financial sources which substantially maximizes the financial benefits for the user. Next, the system uses the selected subset of financial sources to fulfill the financial transaction on behalf of the user.

21 Claims, 4 Drawing Sheets

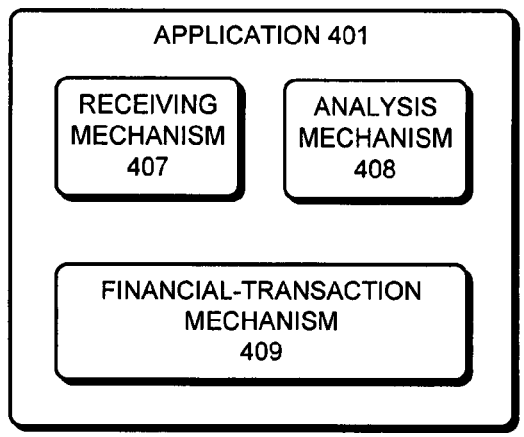
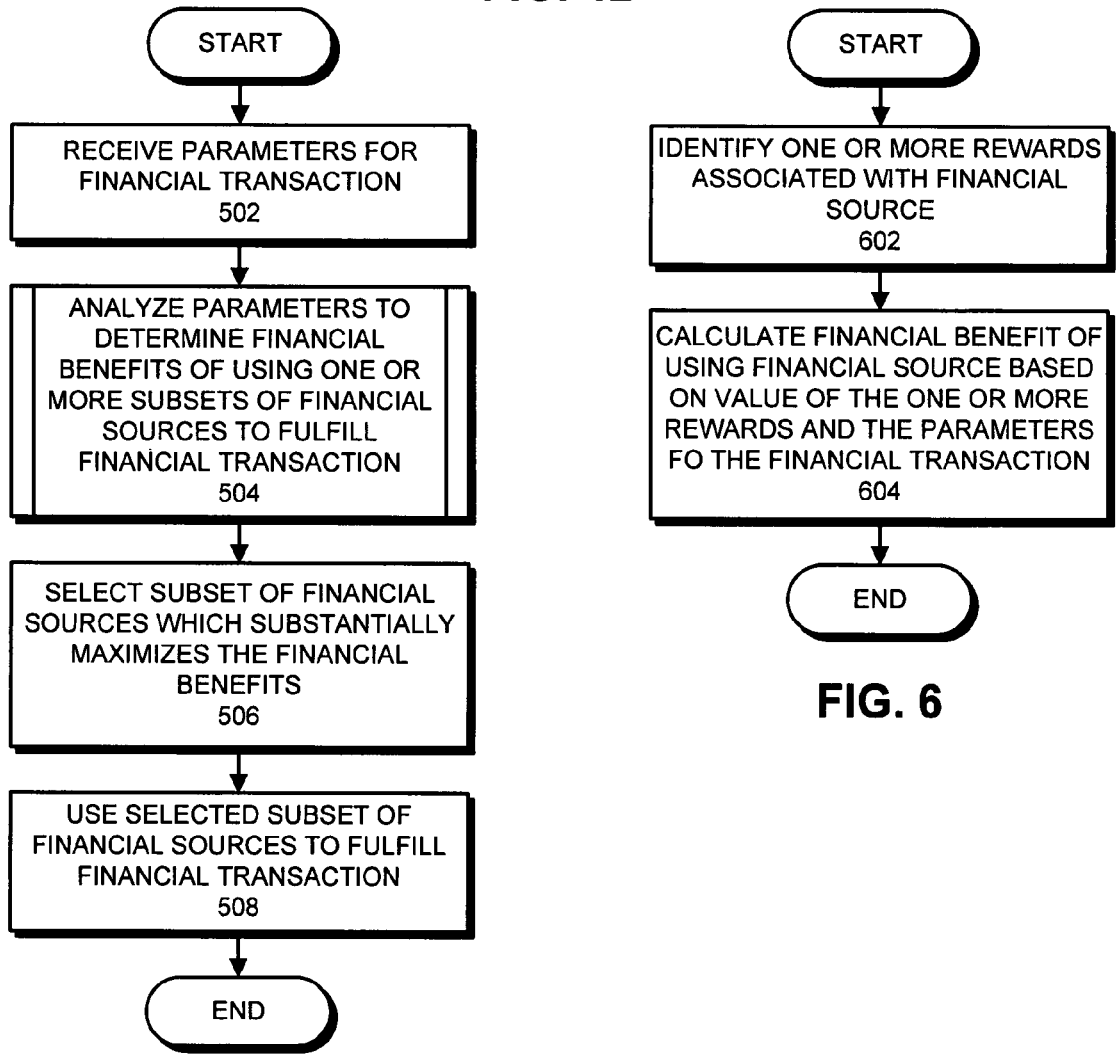

METHOD AND APPARATUS FOR PERFORMING A FINANCIAL TRANSACTION

RELATED APPLICATION

The subject matter of this application is related to the subject matter in a co-pending non-provisional application by Matt E. Hart entitled, "Method and Apparatus for Performing a Financial Transaction," having Ser. No. 11/523,929, and filing date 19 Sep. 2006.

BACKGROUND

Related Art

The present invention relates to techniques for performing a financial transaction on behalf of a user.

Credit cards issuers typically provide value-added programs that reward consumers for using specific credit cards. The rewards associated with these value-added programs are based on the purchases made by the consumer and can include: airline frequent flyer miles, a percentage of the purchase amount (i.e., cash back), an upgrade to a higher service level provided by the credit card issuer (e.g., gold to platinum status), or points that can be redeemed with partners of the value-added program. Moreover, each value-added program can offer different types of rewards and incentives. For example, a gasoline credit card might give 5% cash back for gasoline purchases, but only 1% cash back for other purchases, whereas an airline credit card might offer double miles for purchases made at supermarkets and single miles for all other purchases.

Furthermore, consumers typically have more than one credit card and rewards cannot be transferred between the value-added programs associated with the different credit cards. Moreover, some value-added programs can only be applied to certain purchases (e.g., gasoline, supermarket, etc.).

These value-added programs are not limited to credit card rewards programs. For example, supermarkets and retailers offer rewards programs that give a consumer a discount on products in exchange for permission to track the buying habits of the consumer.

Keeping track of these value-added programs and determining which credit card and/or other value-added programs generates the best financial benefit for a particular purchase is a complicated task.

SUMMARY

One embodiment of the present invention provides a system that performs a financial transaction on behalf of a user. During operation, the system receives parameters for the financial transaction. Next, the system analyzes the parameters to determine financial benefits of using one or more subsets of financial sources from a set of financial sources associated with the user to fulfill the financial transaction. The system then selects a subset of financial sources which substantially maximizes the financial benefits for the user. Next, the system uses the selected subset of financial sources to fulfill the financial transaction on behalf of the user.

In one embodiment, the parameters associated with the financial transaction can include: a payee; an amount of money involved in the financial transaction; and a category for the payee.

In embodiment, the financial transaction can include paying a bill.

In one embodiment, while analyzing the parameters to determine the financial benefits of using one or more subsets of financial sources to fulfill the financial transaction, for each financial source within the set of financial sources, the system (1) identifies one or more rewards associated with the financial source; and (2) calculates the financial benefit of the financial source based on a value of the one or more rewards and the parameters for the financial transaction.

In one embodiment, prior to calculating the financial benefit of the financial source, the system calculates the value of the one or more rewards for the financial source in terms of a base unit.

In one embodiment, the base unit is a unit of currency.

In one embodiment, the system receives an indication of one or more preferred financial sources in the set of financial sources. The system then adjusts the financial benefit of each financial source within the set of financial sources so that the one or more preferred financial sources are valued more highly than other financial sources.

In one embodiment, a reward can include: a specified interest rate; a cash-back reward; a frequent-flyer reward; a hotel reward; and any other type of reward.

In one embodiment, the system generates a report for the user which identifies the selected subset of financial sources and indicates the financial benefits of using the selected subset of financial sources.

In one embodiment, the system notifies the user of other financial sources which can provide greater financial benefit than the set of financial sources already associated with the user.

In one embodiment, a financial source can include: a checking account; a savings account; a credit card account; a debit card account; an investment account; and any other financial source.

In one embodiment, the operations are performed within a client-based application.

In one embodiment, the operations are performed within an Internet-based application.

BRIEF DESCRIPTION OF THE FIGURES

FIG. 4B presents a block diagram illustrating an application which performs financial transactions on behalf of a user in accordance with an embodiment of the present invention.

FIG. 5 presents a flow chart illustrating another process for fulfilling a financial transaction in accordance with an embodiment of the present invention.

FIG. 6 presents a flow chart illustrating the process of analyzing parameters to determine the financial benefits of using a subset of financial sources to fulfill a financial transaction in accordance with an embodiment of the present invention.

DETAILED DESCRIPTION

Figure 1:
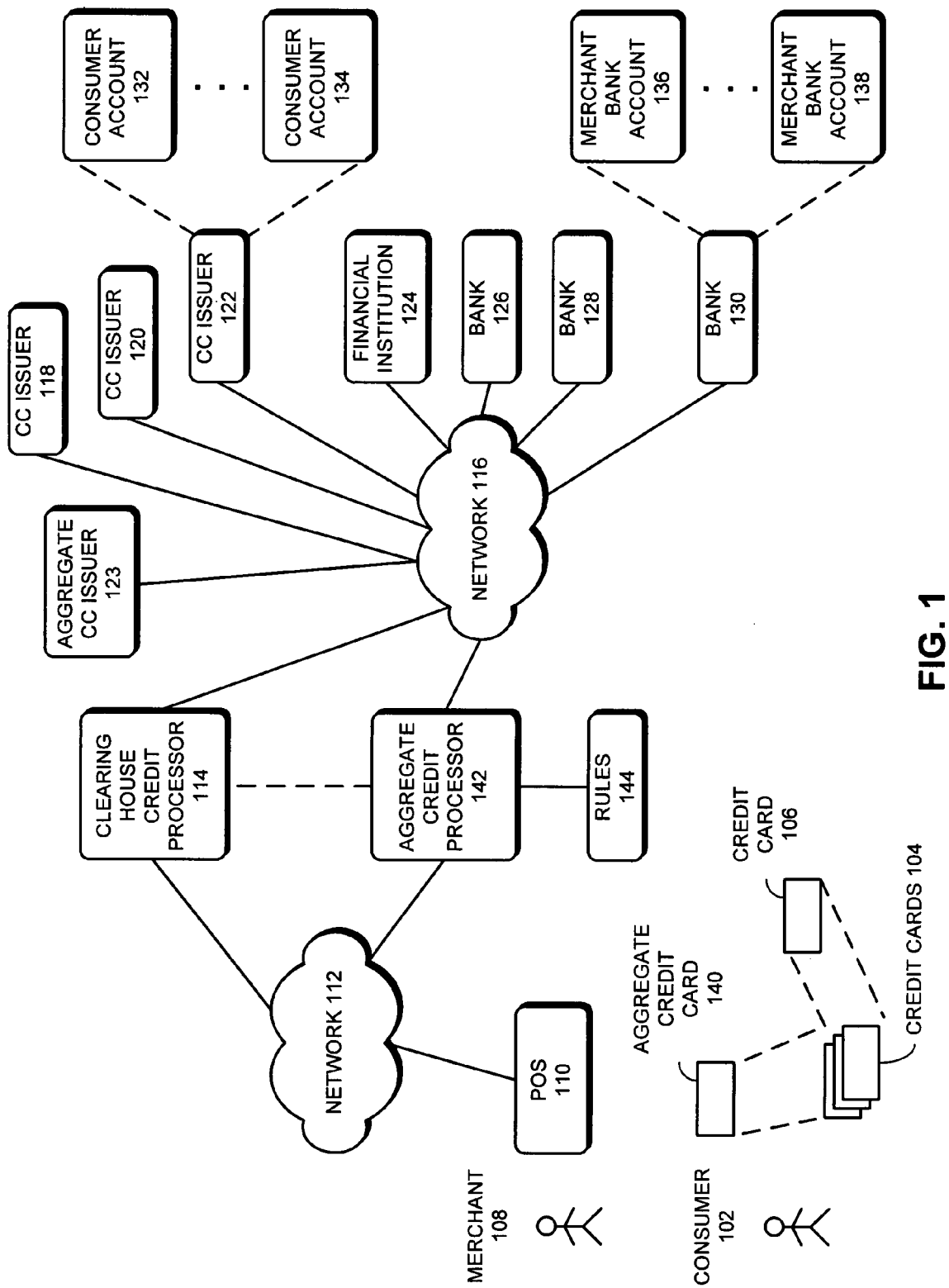
FIG. 1 presents a block diagram illustrating an aggregated credit card transaction in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention aggregates multiple credit cards for a consumer and replaces the multiple credit cards with a single aggregate credit card. In this embodiment, when the consumer makes a purchase using the aggregate credit card, the amount of money associated with the purchase is applied to one or more credit cards that meet specified selection criteria.

Note that the discussion below describes the present invention as applied to credit card transactions. However, the present invention can be applied to any financial transaction wherein a consumer wants to determine the benefits of using one or more financial sources to fulfill the financial transaction.

One embodiment of the present invention applies a subset of financial sources for a user to fulfill a financial transaction on behalf of the user, wherein the subset of financial sources substantially maximizes the financial benefits for the user. In one embodiment, the financial transaction can include paying bills.

Traditional Credit Card Transactions

A typical consumer has a number of credit cards. When making a purchase from a merchant, the consumer chooses one credit card to make the purchase. During this purchase, the merchant uses a point-of-sale device (POS) to initiate a credit card authorization request to determine whether the consumer is authorized to use the chosen credit card to make the purchase. Note that the point-of-sale device can include any type of device which can authorize a purchase using credit or using any other financial source. The point-of-sale device then contacts a clearing house credit processor through a network to request authorization to apply the amount of money associated with the purchase to the chosen credit card.

Note that the networks can generally include any type of wired or wireless communication channel capable of coupling together computing nodes. This includes, but is not limited to, a local area network, a wide area network, a telephone network, or a combination of networks. In one embodiment of the present invention, the network includes the Internet.

Note that the clearing house credit processor can include any financial institution that can process credit card transactions. Also note that more than one clearing house credit processor can be used. Furthermore, note that credit card clearing house processors can be coupled to the same network or coupled to different networks.

Next, the clearing house credit processor analyzes the parameters associated with the authorization request and determines which credit card issuer issued the chosen credit card to the consumer. The clearing house credit processor then sends a request through the network to the determined credit card issuer to authorize the purchase.

Note that credit card issuers typically provide services to multiple consumers. Hence, the credit card issuer first identifies which consumer account is associated with the chosen credit card and then determines whether the amount of money associated with the purchase can be authorized for the identified consumer account. The answer to the authorization request is sent back to the clearing house credit processor which forwards the information back to the POS device. If the amount of money associated with the purchase is authorized, the credit card issuer applies a charge to the identified consumer account for that amount once the transaction is finalized.

The clearing house credit processor then identifies a bank that maintains a merchant account for the merchant based on the parameters associated with the authorization request. For example, the clearing house credit processor can identify bank 130 and merchant bank account 136. In one embodiment of the present invention, the bank can be any financial institution (e.g., financial institution 124), including, but not limited to, a bank, a lending institution, a credit card company, an investment broker, or any other type of institution capable of holding equity or debt on behalf of an entity. A credit for the purchase amount is then applied to the identified merchant bank account.

Note that the above-described process is presented for illustrative purposes only and that the credit card authorization process can be modified without changing the operation of the present invention. Furthermore, note that when applying other value-added programs not associated with credit cards to the purchase, a separate process can be used to authorize and to apply the benefits of the value-added program.

Aggregated Credit Card Transactions

FIG. 1 presents a block diagram illustrating an aggregated credit card transaction in accordance with an embodiment of the present invention. The process is similar to the traditional credit card transaction process described above, with the exception that an aggregated credit card is used.

In one embodiment of the present invention, credit cards 104 for consumer 102 are aggregated into a single aggregate credit card 140. In one embodiment of the present invention, information about the benefits and value-added programs, the interest rates, and credit limits associated with credit cards 104 are stored at aggregate credit processor 142. In another embodiment of the present invention, information about the benefits of value-added programs not associated with credit cards is also stored at aggregate credit processor 142 so that these benefits can be accessed when consumer 102 uses aggregate credit card 140.

In FIG. 1, consumer 102 uses aggregate credit card 140 to make a purchase from merchant 108. During this purchase, merchant 108 uses point-of-sale device (POS) 110 to initiate a credit card authorization request to determine whether consumer 102 is authorized to use aggregate credit card 140 to make the purchase. Point-of-sale device 110 then contacts aggregate credit processor 142 through network 112 to request authorization to apply the amount of money associated with the purchase to aggregate credit card 140.

In one embodiment of the present invention, aggregate credit processor 142 uses rules 144 to determine a financial benefit for using a given credit card associated with aggregate credit card 140. Note that the rules are described in more detail below.

Figure 2:
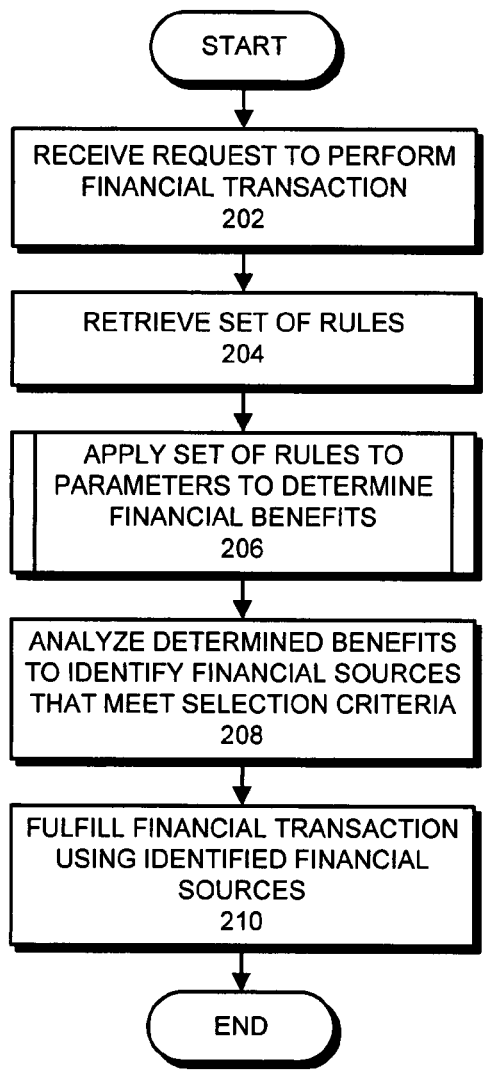
FIG. 2 presents a flow chart illustrating the process of fulfilling a financial transaction in accordance with an embodiment of the present invention.

FIG. 2 presents a flow chart illustrating the process of fulfilling a financial transaction using an aggregate financial source in accordance with an embodiment of the present invention. The process begins when the system receives a request on behalf of a user to perform the financial transaction, wherein the request includes parameters for the financial transaction (step 202). Next, the system retrieves a set of rules associated with financial sources which can be used to fulfill the financial transaction, wherein the rules for a given financial source can be used to determine financial benefits associated with using the given financial source (step 204). The system then applies the set of rules to the parameters to determine the financial benefits associated with using each of the financial sources (step 206). Note that step 206 is described in more detail in reference to FIG. 3 below. Next, the system analyzes the determined financial benefits to identify one or more financial sources that meet a selection criteria (step 208). The system then fulfills the financial transaction using the identified financial sources (step 210).

In one embodiment of the present invention, the financial transaction can include, but is not limited to, a credit card transaction, a debit card transaction, an electronics fund transfer (EFT), an automated teller machine (ATM) transaction, a transfer of balance between credit cards, a loan transaction, or any other financial transaction.

In one embodiment of the present invention, the parameters associated with the financial transaction can include, but are not limited to, a merchant identification number, a merchant bank account number, an amount of money involved in the financial transaction, a list of items involved in the financial transaction, and a list of categories corresponding to the list of items.

In one embodiment of the present invention, the selection criteria can include, but are not limited to, a financial source with the highest financial benefit, a financial source with the lowest financial benefit, a subset of the financial sources with the highest financial benefits, a subset of the financial sources with the lowest financial benefits, a combination of selection criteria, or any other selection criteria.

In one embodiment of the present invention, after determining one or more credit cards to use to fulfill the purchase, aggregate credit processor 142 sends a request through network 116 to the credit card issuer(s) that issued the determined credit cards to authorize the purchase. For example, if aggregate credit processor 142 determines that credit card 106 for consumer 102 is the most beneficial credit card to use, aggregate credit processor 142 identifies the credit card issuer that issued credit card 106 to consumer 102. In one embodiment of the present invention, aggregate credit processor 142 determines the credit card issuer that issued credit card 106 to consumer 102 by looking up information about credit card 106 stored on aggregate credit processor 142. For example, aggregate credit processor 142 can determine that credit card issuer 122 issued credit card 106 for consumer 102. As a result, aggregate credit processor 142 sends a request through network 116 to credit card issuer 122 to authorize the purchase.

Note that networks 112 and 116 can generally include any type of wired or wireless communication channel capable of coupling together computing nodes. This includes, but is not limited to, a local area network, a wide area network, a telephone network, or a combination of networks. In one embodiment of the present invention, networks 112 and 116 include the Internet. Also note that networks 112 and 116 can be the same network.

In one embodiment of the present invention, aggregate credit processor 142 uses clearing house credit processor 114 to authorize the purchase. In another embodiment of the present invention, aggregate credit processor 142 sends the authorization request to credit card issuer 122.

Credit card issuer 122 then receives the request and determines the consumer account that is associated with credit card 106. For example, credit card issuer 122 can determine that credit card 106 is associated with consumer account 134. Hence, credit card issuer 122 determines whether the amount of money associated with the purchase can be authorized for consumer account 134. The answer to the authorization request is sent back to aggregate credit processor 142 which forwards the information back to POS device 110. If the amount of money associated with the purchase is authorized, credit card issuer 122 applies a charge to consumer account 134 for that amount once the transaction is finalized.

In one embodiment of the present invention, a credit card issuer is also an aggregate credit processor. In FIG. 1B, aggregate credit card issuer 123 is both an aggregate credit card issuer and an aggregate credit processor. For example, transactions involving aggregate credit card issuer 123 can take place as follows. POS device 110 makes an authorization request through clearing house credit processor 114. Clearing house credit processor then queries aggregate credit card issuer 123 to determine whether the customer is authorized to make a purchase using the aggregate credit card 140. Next, aggregate credit card issuer 123 applies rules associated with aggregate credit card 140 to determine which credit card accounts associated with aggregate credit card 140 are to be charged. Aggregate credit card issuer 123 then processes the charge using the determined credit card accounts through clearing house credit processor 114. Clearing house credit processor 114 checks with credit card issuers that issued the determined credit cards (e.g., credit card issuer 122). In one embodiment of the present invention, aggregate credit card issuer 123 is not a credit card issuer that is queried by credit card processor 114. Finally, if the credit card issuers authorize the purchase amount, the authorizations are returned through aggregate credit card issuer 123 and back to merchant 108.

Rules

In one embodiment of the present invention, a rule for a value-added program associated with a financial source is used to determine a financial benefit of using the financial source. In one embodiment of the present invention, the set of rules can include, but are not limited to, a rule that can be used to determine benefits associated with a credit card rewards program, a rule that can be used to determine benefits associated with an airline frequent flyer program, a rule that specifies credit card interest rates, a rule that specifies loan interest rates, or any other rule that can be used to determine benefits associated with a financial source.

Figure 3:
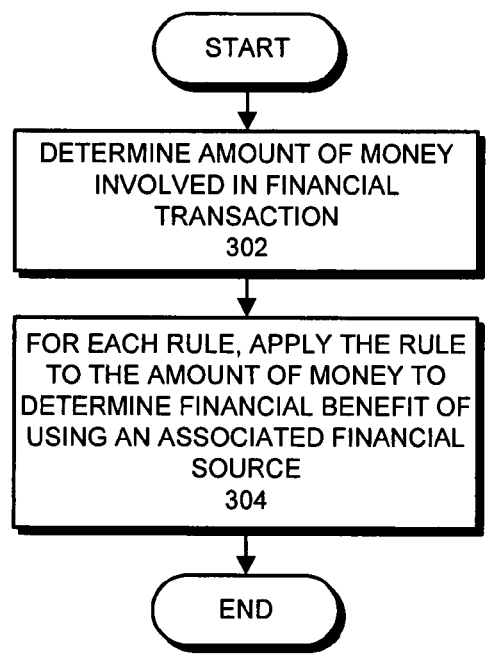
FIG. 3 presents a flow chart illustrating the process of determining a financial benefit of using a given financial source in accordance with an embodiment of the present invention.

FIG. 3 presents a flow chart illustrating the process of applying the set of rules to the parameters to determine the financial benefits in accordance with an embodiment of the present invention. The process begins when the system determines an amount of money involved in the financial transaction from the parameters for the financial transaction (step 302). For each rule in the set of rules, the system applies the rule to the amount of money to determine a financial benefit of using an associated financial source to fulfill the financial transaction, wherein the financial benefit is specified in a base unit (step 304).

In one embodiment of the present invention, the base unit is a unit of currency. For example, the unit of currency can be a dollar.

In one embodiment of the present invention, a default rule for a financial source is provided by a financial institution. In this embodiment, an employee of a financial institution can use an application programming interface (API) to enter information about the financial source. In another embodiment of the present invention, a third party processor can manually create a default rule for a financial source provided by a financial institution.

In one embodiment of the present invention, an aggregate credit processor uses the parameters associated with a purchase to determine information which is used to select a credit card to fulfill a transaction. For example, the aggregate credit processor can determine a merchant identifier (ID) associated with the purchase and use this merchant ID to determine whether using a given credit card at this merchant is financially beneficial as compared to using the other credit cards.

In some situations, a consumer may want to override a default rule provided by a financial institution. For example, if a consumer is going to visit a theme park for a vacation, the consumer may prefer to have all purchases made in the theme park go to a credit card associated with the theme park. Hence, the consumer may modify the default rule for the credit card associated with the theme park to increase the financial benefit of using the credit card at the theme park. Similarly, if a consumer wants to accumulate reward points on a given credit card, the consumer can modify the default rule for the given credit card to increase the financial benefit of using the given credit card.

Hence, in one embodiment of the present invention, a default rule provided by a financial institution can be overridden by a user-specified rule. In this embodiment, the user-specified rule can include, but is not limited to: a rule to use a given financial source for a given financial transaction; a rule to use a given financial source until a specified balance associated with the financial source is reached; a rule to distribute the financial transaction across a plurality of financial sources; or any other rule that overrides the default rule provided by a financial institution.

Determining the financial benefit of a given financial source can be done on a case-by-case basis. For example, determining the financial benefit of a cash back program is different than determining the financial benefit of an airline frequent flyer program. Several examples of determining the financial benefit of value-added programs are illustrated below.

Determining the financial benefit of a cash-back valued-added program can be straightforward. For example, if a credit card gives 5% cash back on all purchases, the default rule for this credit card can be set so that the financial benefit of using this credit card, in terms of the base unit, is 0.05. Similarly, if a credit card gives 5% cash back on gasoline purchases, but only 1% cash back on all other purchases, the default rule for this credit card can be set so that the financial benefit of using this credit card in terms of the base unit is 0.05 for gasoline purchases and 0.01 for all other purchases. Hence, in one embodiment of the present invention, the default rule for a credit card with a cash back program can be set so that the financial benefit is proportional to a percentage of a base unit.

Airline frequent flyer programs sometimes reward consumers with double or triple miles depending on the type of items purchased or depending on the vendor from which the purchase was made. For example, consider a credit card that gives triple miles for items purchased at Store A and single miles for all other purchases. The default rule for this credit card can be set so that the financial benefit of using this credit card to make a purchase from Store A is worth three times as much as purchases made from other stores. For example, the default rule can be set so that the financial benefit of using this credit card in Store A is 3 and the financial benefit of using this credit card for other purchases is 1. Hence, in this example, the default rule for a credit card associated with an airline frequent flyer program is set so that the financial benefit is proportional to the miles offered for given purchases.

As pointed out above, comparing one value-added program to another can be difficult. For example, consider two credit cards with different types of value-added programs. The first credit card gives 3% cash back on all purchases, whereas the second credit card gives double miles for purchases made at gas stations and single miles for all other purchases. In one embodiment of the present invention, the value-added programs are compared by calculating a real cash value for the value-added program. For example, if the cost to upgrade from economy class to first class on a single leg of a flight is 15,000 miles, and if the cash value in the eyes of the consumer for the upgrade is $1500, then the cash value of a single mile in terms of the base unit is 0.1 and double miles purchases are worth 0.2. These numbers are both larger than the 3% or 0.03 cash value associated with the value-added program for the first credit card. Hence, if the consumer is making a gasoline purchase, the second credit card is a better deal and the aggregate credit processor chooses the second credit card to fulfill the gasoline purchase.

Some credit card value-added programs provide multiple ways to redeem rewards. For example, a credit card issuer may give points based on the type of purchase made, as described above. However, the actual financial benefit of choosing a given credit card can depend on the type of redemption made. Consider a consumer with two credit cards. The first credit card gives 3% cash back on all purchases and the second credit card gives double points for gasoline purchases and single points for all other purchases. Furthermore, the financial institution that issued the second credit card can have multiple rewards partners, such as airlines and stores. The points earned on the second credit card can be redeemed at these rewards partners, but the financial benefit of redeeming the points at each rewards partner can be different. For example, for the second credit card, one point can be used to redeem one frequent flyer mile or one point can be used to get $0.03 cash back. Hence, for the second credit card, not only does the financial benefit of the value-added program need to be accounted for, but each possible redemption program must also be accounted for.

In order to determine the financial benefit of the value-added program for the second credit card relative to the first credit card, information about the redemption preferences for the consumer are required. For example, if the consumer is a frequent traveler, the consumer may prefer to accumulate as many frequent flyer miles as possible. Hence, the financial benefit of the second credit card for this consumer is determined relative to the frequent flyer miles redemption program. In one embodiment of the present invention, if the credit card has multiple ways to earn points (or rewards) and multiple ways to redeem the rewards, the financial institution issuing the credit card selects a default rewards-redemption program on which to base the default rule. In another embodiment of the present invention, the financial institution uses statistical analysis to determine how a typical consumer redeems rewards in order to select the default rewards-redemption program. In another embodiment of the present invention, the user specifies the rewards-redemption program on which to base the rule.

In one embodiment of the present invention, the default rule can be modified by the financial institution if there is a promotion.

One embodiment of the present invention aggregates information about rewards programs that are not based on financial instruments and uses parameters associated with the purchase to determine whether to apply these rewards program to the purchase. These rewards programs can include, but are not limited to, supermarket rewards programs and other rewards programs that track consumer spending habits in exchange for a discount on purchases. For example, a supermarket may provide a rewards card that gives holders of the rewards card a discount on items purchased at the supermarket. If a consumer is shopping at the supermarket that issued the rewards card to the consumer, aggregate credit processor 142 can use the parameters associated with the purchase to determine if a rule associated with the rewards card exists. If so, aggregate credit processor 142 can apply the rewards card to the purchase. This selection process can occur independently or in conjunction with the selection process associated with the financial sources. Hence, an optimal set of value-added programs can be identified and applied to a given purchase.

Paying Bills

Figure 4A:
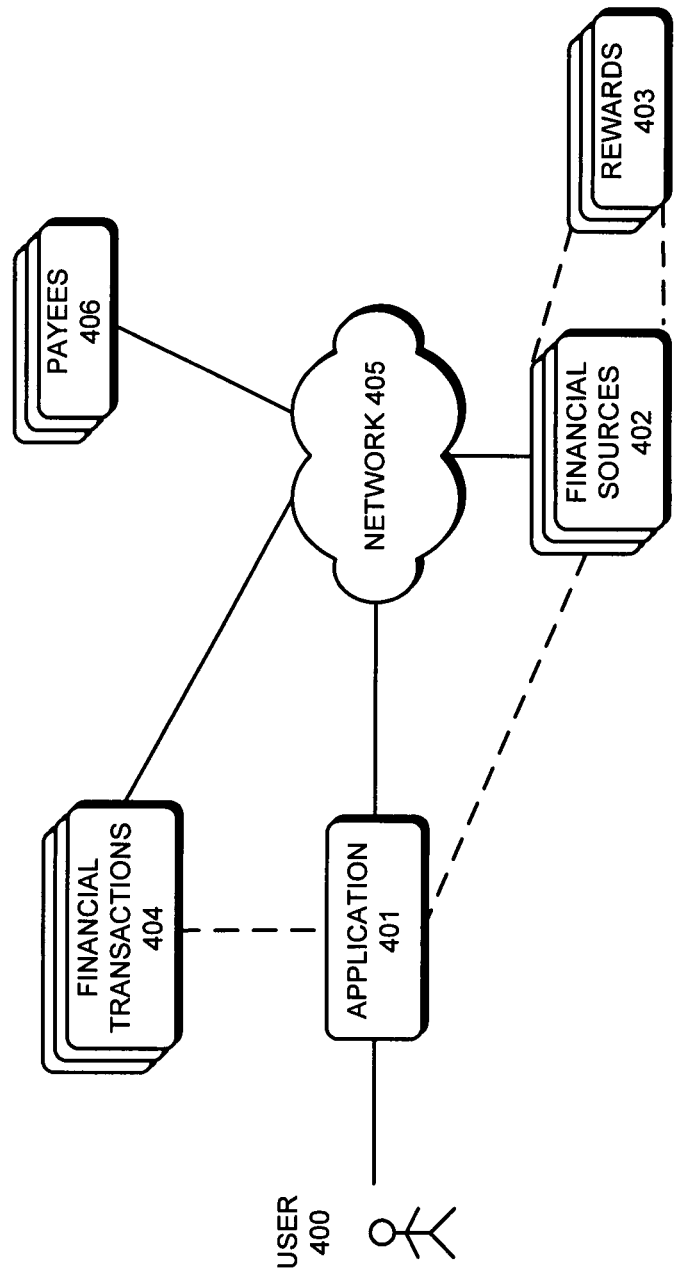
FIG. 4A presents a block diagram illustrating a bill-paying operation in accordance with an embodiment of the present invention.

One embodiment of the present invention can pay a bill on behalf of a user. More specifically, FIG. 4A presents a block diagram illustrating a bill-paying operation for user 400 in accordance with an embodiment of the present invention. As illustrated in FIG. 4A, user 400 has one or more financial sources 402, each of which can be associated with one or more rewards 403. In one embodiment of the present invention, a financial source can include: a checking account; a savings account; a credit card account; a debit card account; an investment account; and any other financial source. In one embodiment of the present invention, a reward can include: a specified interest rate (e.g., in a savings account, CD account, interest-bearing checking account, etc.); a cash-back reward; a frequent-flyer reward; a hotel reward; and any other type of reward.

In one embodiment of the present invention, user 400 enters information about financial sources 402 into application 401. In one embodiment of the present invention, application 401 is a client-based application. For example, the client-based application can include a personal finance application or a business finance application. In another embodiment of the present invention, application 401 is an Internet-based application. For example, the Internet-based application can include an application which can be accessed by a web browser.

FIG. 4B presents a block diagram illustrating application 401 which performs financial transactions on behalf of a user in accordance with an embodiment of the present invention. Application 401 includes receiving mechanism 407, analysis mechanism 408, and financial-transaction mechanism 409.

In one embodiment of the present invention, receiving mechanism 407 is configured to receive parameters for the financial transaction. In one embodiment of the present invention, analysis mechanism 408 is configured to: (1) analyze the parameters to determine financial benefits of using one or more subsets of financial sources from a set of financial sources associated with the user to fulfill the financial transaction, and (2) select a subset of financial sources which substantially maximizes the financial benefits for the user. In one embodiment of the present invention, financial-transaction mechanism 409 is configured to use the selected subset of financial sources to fulfill the financial transaction on behalf of the user.

Referring back to FIG. 4A, in another embodiment of the present invention, information about financial sources 402 is automatically entered into application 401 based on an identifier for user 400. For example, user 400 can supply a social security number to application 401, which can then search for financial sources associated with the social security number.

In one embodiment of the present invention, one or more financial transactions 404 are associated with user 400 and payees 406. In one embodiment of the present invention, the one or more financial transactions 404 can include bills for user 400. In one embodiment, payees 406 can include a cable TV company, a satellite TV company, a public utilities company (e.g., water, gas, electricity, etc.), a waste-disposal company, a credit card company, a bank, a telephone company, and any other payee. Note that payees 406 are typically have accounts at financial institutions (not shown) which can receive payments from users.

In one embodiment of the present invention, financial transactions 404 are transmitted to application 401 by payees 406 through network 405. In another embodiment of the present invention, user 400 enters financial transactions 404 into application 401.

In one embodiment of the present invention, user 400 enters information about rewards 403 associated with financial sources 402. In another embodiment of the present invention, application 401 automatically enters rewards 403 based on information about financial sources 402. For example, application 401 can look up rewards associated with financial sources from a database.

In one embodiment of the present invention, for a given financial transaction within financial transactions 404, application 401 analyzes the given financial transaction to determine financial benefits of using one or more subsets of financial sources 402 to fulfill the given financial transaction. In doing so, application 401 selects a subset of financial sources 402 to substantially maximize the financial benefits for the user. This process is described in more detail with reference to FIGS. 5-6.

In one embodiment of the present invention, application 401 fulfills the given financial transaction using the selected subset of financial sources on behalf of user 400. In one embodiment, application 401 applies the subset of financial sources to pay a given payee. For example, application 401 can request that the subset of financial sources transfer funds to an account at financial institution for the given payee. In one embodiment, funds are electronically transferred from the subset of financial sources to an account at the financial institution for the given payee through network 405.

FIG. 5 presents a flow chart illustrating a process of fulfilling a financial transaction in accordance with an embodiment of the present invention. The process begins when the system receives parameters for the financial transaction (step 502). In one embodiment of the present invention, the parameters associated with the financial transaction can include: a payee; an amount of money involved in the financial transaction; and a category for the payee.

Next, the system analyzes the parameters to determine financial benefits of using one or more subsets of financial sources from a set of financial sources associated with the user to fulfill the financial transaction (step 504). (Note that step 504 is described in more detail with reference to FIG. 6.) The system then selects a subset of financial sources which substantially maximizes the financial benefits for the user (step 506), and uses the selected subset of financial sources to fulfill the financial transaction on behalf of the user (step 508).

FIG. 6 presents a flow chart illustrating the process of analyzing parameters to determine the financial benefits of using a subset of financial sources to fulfill a financial transaction in accordance with an embodiment of the present invention. For each financial source within the set of financial sources, the system identifies one or more rewards associated with the financial source (step 602), and calculates the financial benefit of the financial source based on a value of the one or more rewards and the parameters for the financial transaction (step 604).

In one embodiment of the present invention, prior to calculating the financial benefit of the financial source, the system calculates the value of the one or more rewards for the financial source in terms of a base unit. In one embodiment, the base unit is a unit of currency. For example, if a credit card gives 3% cash back for all purchases, the reward can be expressed as 0.03.

In one embodiment of the present invention, the system receives an indication of one or more preferred financial sources within the set of financial sources. The system then adjusts the financial benefit of each financial source within the set of financial sources so that the one or more preferred financial sources are valued more highly than other financial sources within the set of financial sources. For example, if a user prefers to earn travel rewards, the system values financial sources which give travel rewards higher than other financial sources.

In one embodiment, the system generates a report for the user which identifies the selected subset of financial sources and indicates the financial benefits of using the selected subset of financial sources. For example, the report can include the amount paid, the financial sources used, and a summary of the rewards earned by using the subset of financial sources.

In one embodiment, the system notifies the user of other financial sources which can provide a greater financial benefit than the financial benefits provided by set of financial sources already associated with the user. For example, if a financial source which is not associated with the user provides more rewards than the user's existing financial sources, the system notifies the user of the other financial source.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing a financial transaction on behalf of a user, comprising:
   receiving a request to perform the financial transaction, wherein the request includes parameters for the financial transaction, and wherein the financial transaction involves a purchase which is to be fulfilled using a plurality of credit cards in a first set of credit cards, wherein the first set of credit cards is currently associated with the user;
   retrieving a set of rules associated with the first set of credit cards, wherein a respective rule in the set of rules determines financial benefits of using a corresponding credit card from the first set of credit cards;
   applying the set of rules, by a computer, to the parameters to determine financial benefits of using subsets of credit cards from the first set of credit cards to fulfill the financial transaction;
   determining a value associated with the financial benefits as multiples of a base unit;
   selecting a subset of credit cards from the first set of credit cards that provide an increased value of the financial benefits over other subsets of credit cards from the first set of credit cards;
   performing the requested financial transaction using the selected subset of credit cards from the first set of credit cards to increase the financial benefits to the user;
   determining, by the computer, a second set of credit cards that are not currently associated with the user;
   determining that the second set of credit cards provide a greater financial benefit for the user than the selected subset of credit cards in performing the requested financial transaction; and
   notifying the user of the second set of credit cards.

2. The method of claim 1, wherein the parameters associated with the financial transaction can include:
   a payee;
   an amount of money involved in the financial transaction; and
   a category for the payee.

3. The method of claim 1, wherein the financial transaction can include paying a bill.

4. The method of claim 1, wherein applying the set of rules to the parameters to determine the financial benefits of using subsets of the credit cards from the first set of credit cards to fulfill the financial transaction involves:
   identifying one or more rewards associated with a subset of the credit cards; and
   calculating the financial benefit of using the subset of the credit cards in the financial transaction based on a value of the one or more rewards and the parameters for the financial transaction.

5. The method of claim 4, wherein the method further comprises:
   receiving an indication of one or more preferred credit cards in the first set of the credit cards; and
   adjusting the financial benefit of a credit card within the first set of the credit cards so that the one or more preferred credit cards are valued more highly than other credit cards within the first set of the credit cards.

6. The method of claim 4, wherein a reward can include:
   a specified interest rate;
   a cash-back reward;
   a frequent-flyer reward;
   a hotel reward; and
   any other type of reward.

7. The method of claim 1, wherein the base unit is a unit of currency.

8. The method of claim 1, wherein the method further comprises generating a report for the user which identifies the selected subset of credit cards from the first set of credit cards and indicates the financial benefit of using the selected subset of credit cards in the financial transaction.

9. The method of claim 1, wherein the method is performed within a client-based application.

10. The method of claim 1, wherein the method is performed within an Internet-based application.

11. A computer-readable storage medium storing instructions that when executed by a computer cause the computer to perform a method for performing a financial transaction on behalf of a user, wherein the method comprises:
    receiving a request to perform the financial transaction, wherein the request includes parameters for the financial transaction, and wherein the financial transaction involves a purchase which is to be fulfilled using a plurality of credit cards in a first set of credit cards, wherein the first set of credit cards is currently associated with the user;
    retrieving a set of rules associated with the first set of credit cards, wherein a respective rule in the set of rules determines financial benefits of using a corresponding credit card from the first set of credit cards;

applying the set of rules to the parameters to determine financial benefits of using subsets of credit cards from the first set of credit cards to fulfill the financial transaction;

determining a value associated with the financial benefits as multiples of a base unit;

selecting a subset of credit cards from the first set of credit cards that provide an increased value of the financial benefits over other subsets of credit cards from the first set of credit cards;

performing the requested financial transaction using the selected subset of credit cards from the first set of credit cards to increase the financial benefits to the user;

determining a second set of credit cards that are not currently associated with the user;

determining that the second set of credit cards provide a greater financial benefit for the user than the selected subset of credit cards in performing the requested financial transaction; and notifying the user of the second set of credit cards.

12. The computer-readable storage medium of claim 11, wherein the parameters associated with the financial transaction can include:
a payee;
an amount of money involved in the financial transaction; and
a category for the payee.

13. The computer-readable storage medium of claim 11, wherein the financial transaction can include paying a bill.

14. The computer-readable storage medium of claim 11, wherein applying the set of rules to the parameters to determine the financial benefits of using subsets of the credit cards from the first set of credit cards to fulfill the financial transaction involves:
identifying one or more rewards associated with a subset of the credit cards; and
calculating the financial benefit of using the subset of the credit cards in the financial transaction based on a value of the one or more rewards and the parameters for the financial transaction.

15. The computer-readable storage medium of claim 14, wherein the method further comprises:
receiving an indication of one or more preferred credit cards in the set of the credit cards; and
adjusting the financial benefit of a credit card within the first set of credit cards so that the one or more preferred credit cards are valued more highly than other credit cards within the first set of the credit cards.

16. The computer-readable storage medium of claim 14, wherein a reward can include:
a specified interest rate;
a cash-back reward;
a frequent-flyer reward;
a hotel reward; and
any other type of reward.

17. The computer-readable storage medium of claim 11, wherein the base unit is a unit of currency.

18. The computer-readable storage medium of claim 11, wherein the method further comprises generating a report for the user which identifies the selected subset of the credit cards from the first set of credit cards and indicates the financial benefit of using the selected subset of the credit cards in the financial transaction.

19. The computer-readable storage medium of claim 11, wherein the method is performed within a client-based application.

20. The computer-readable storage medium of claim 11, wherein the method is performed within an Internet-based application.

21. An apparatus for performing a financial transaction on behalf of a user, comprising:
a processor;
a memory;
a request-receiving mechanism configured to receive a request to perform the financial transaction, wherein the request includes parameters for the financial transaction, and wherein the financial transaction involves a purchase which can be fulfilled using a plurality of credit cards in a first set of credit cards, wherein the first set of credit cards is currently associated with the user;
a retrieving mechanism configured to retrieve a set of rules associated with the plurality of credit cards, wherein a respective rule in the set of rules determines financial benefits of using a corresponding credit card from the first set of credit cards;
an applying mechanism configured to apply the set of rules to the parameters to determine financial benefits of using subsets of the credit cards from the first set of credit cards to fulfill the financial transaction;
a determining mechanism configured to determine a value associated with the financial benefits as multiples of a base unit;
a selecting mechanism configured to select a subset of credit cards from the first set of credit cards that provide an increased value of the financial benefits over other subsets of credit cards from the first set of credit cards;
a performing mechanism configured to perform the requested financial transaction using the selected subset of credit cards from the first set of credit cards to increase the financial benefits to the user;
the determination mechanism further configured to determine a second set of credit cards that are not currently associated with the user;
the determination mechanism further configured to determine that the second set of credit cards provide a greater financial benefit for the user than the selected subset of credit cards in performing the requested financial transaction; and
a notification mechanism configured to notify the user of the second set of credit cards.

* * * * *